United States Patent Office 3,448,565
Patented June 10, 1969

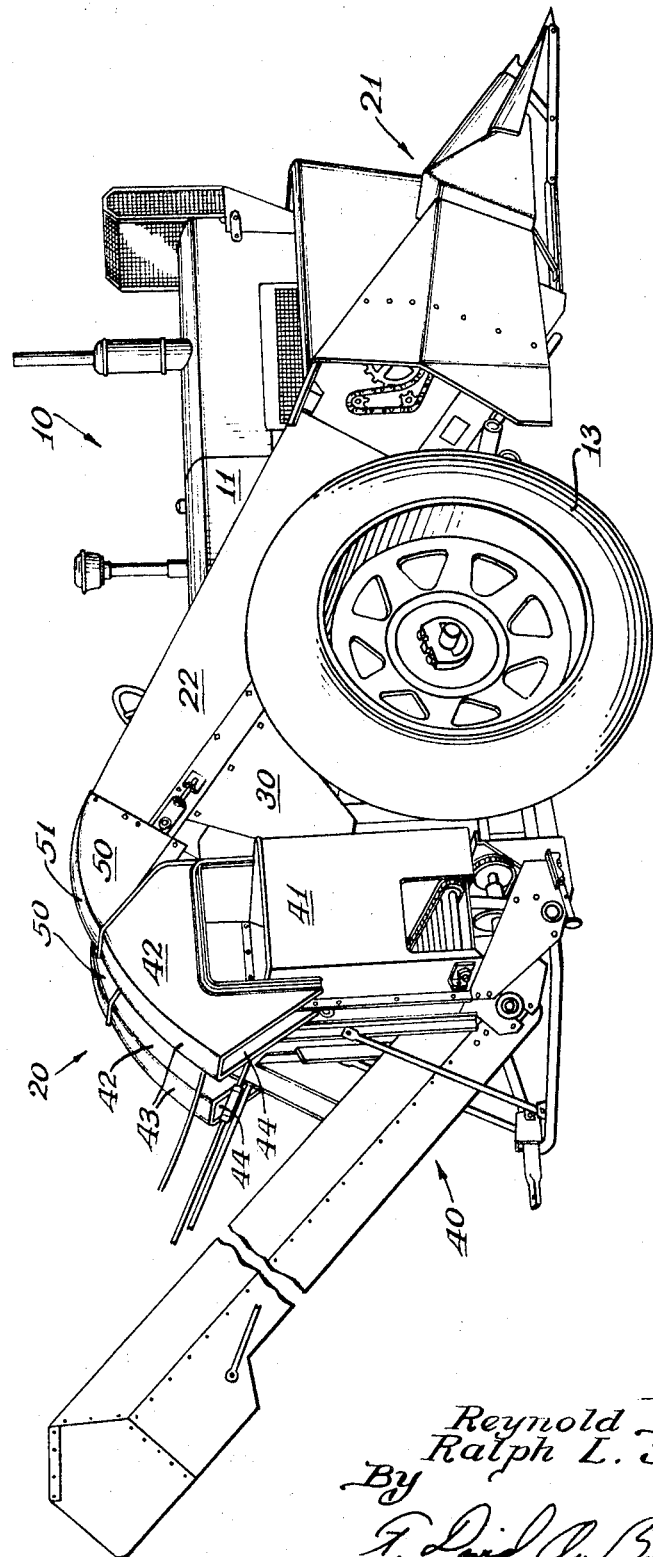

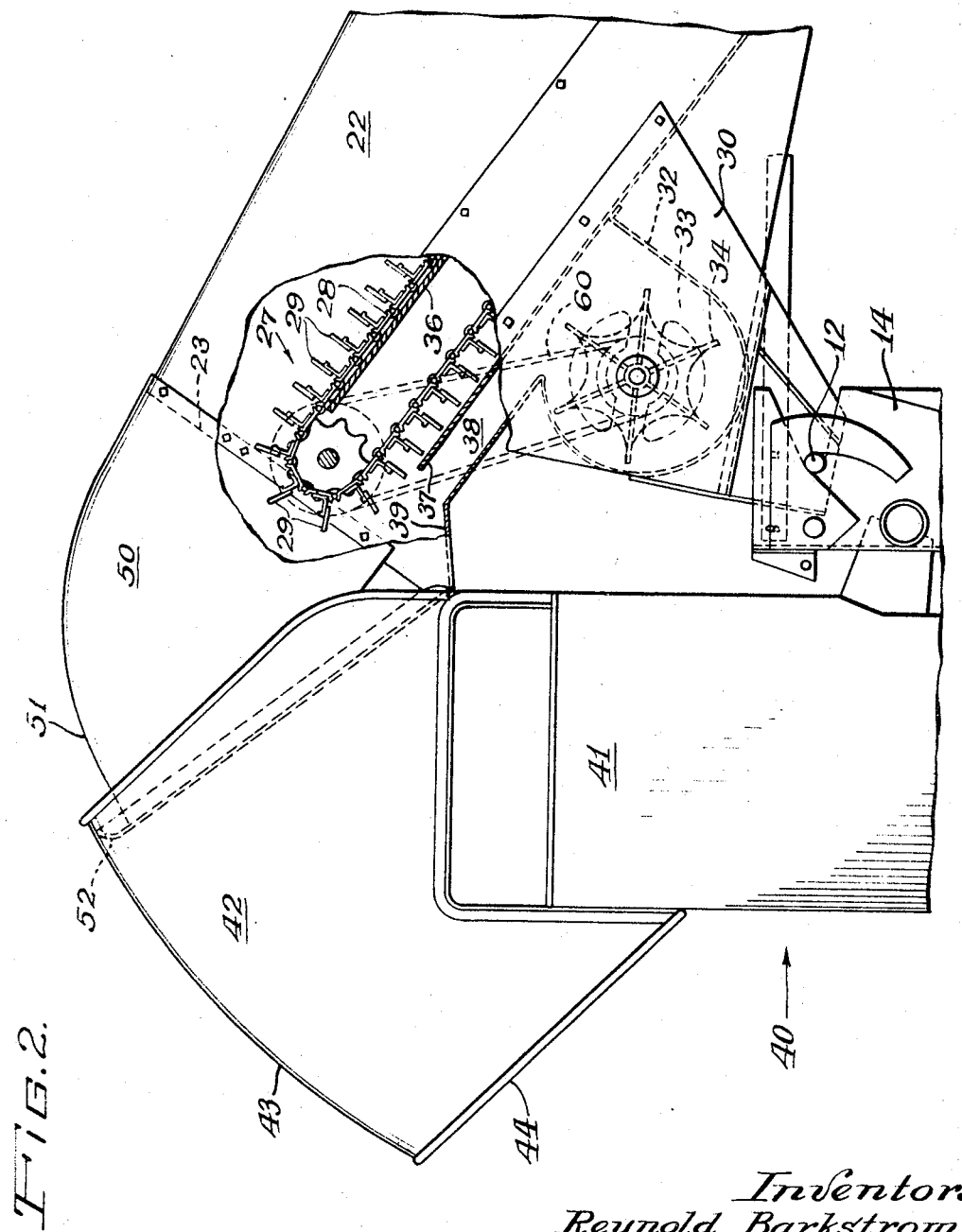

3,448,565
CORN PICKING UNIT
Reynold Barkstrom, Moline, and Ralph L. Sutton, Rock Island, Ill., assignors to International Harvester Company, Chicago, Ill., a corporation of Delaware
Filed Mar. 29, 1965, Ser. No. 443,427
Int. Cl. A01d 45/02
U.S. Cl. 56—18                    2 Claims

ABSTRACT OF THE DISCLOSURE

A cleaning system for a corn picking unit having a fan and fan casing carried by the upper ends of the first elevator. The discharge duct of the fan casing is arranged to direct a blast of air through the falling material to thus carry away the light debris and permit the more dense material to fall into the hopper.

---

The present invention relates to mounted corn harvesters and more particularly to the cleaning system for a mounted corn harvester.

Tractor mounted corn harvesters of the type having first elevators that deposit the ear corn into a processing unit carried on the rear of the tractor have not generally included material cleaning systems in the picking and first elevator portions. As a result much loose trash is fed into the hopper or processing unit where an additional amount of trash is produced. In the case of a hopper this trash is then conveyed through the elevators to the trailing wagon and eventually to the storage bins. The material cleaning systems contained in a processing unit normally function adequately to separate the trash fed thereto from the first elevator and also the trash produced in the processing unit. However, under some conditions such as when the harvested material is very dry the cleaning system is often overloaded which greatly reduces its efficiency. Another disadvantage found in present cleaning systems is that the trash is discharged such that it can blow into a trailing wagon or raise to engulf the operator.

The purpose of this invention is to provide a corn harvesting machine that includes a material cleaning system in the first elevators that supplies a clean sample of material to the hopper or processing unit and the possibility of overloading the processing unit's material cleaning system is reduced permitting it to operate at an efficient level. This material cleaning system in the first elevators is particularly efficient and effective in that it does not require any additional material conveying means since the cleaning occurs while the material is falling from the first elevating units into the processing unit or hopper. The only power required for the first elevator cleaning system is the power to drive the fans. The subject first elevator cleaning system also has the advantage that trash is deflected to the ground behind the corn harvester. Thus eliminating the possibility of trash blowing into a trailing wagon or causing the operator discomfort from dust and dirt.

An object of the present invention is to provide a corn harvester that supplies the processing unit a clean sample of material.

Another object is to provide a material cleaning system in the first elevator portion of the corn harvesting machine that cleans the material as it falls from the first elevator into the processing unit.

Still another object is to provide a cleaning system in the first elevator portion of the corn harvesting machine that directs the trash rearwardly and downwardly to prevent this collection in a trailing receptacle or in the operator's working area.

Yet another object is the provision of a material cleaning system in the first elevator portion of a corn harvesting machine that is housed in the tractor mounts of the first elevators. These and other objects of the invention will become more apparent from the specification and drawings, wherein:

FIGURE 1 is a perspective view of a tractor and mounted corn harvester including material cleaning units in the first elevators; and FIGURE 2 is a side view of the upper end of the first elevator having portions broken away to better show the conveyor.

Referring now to the drawings wherein like reference characters designate like or corresponding parts throughout the several views there is shown in FIGURE 1 a tractor 10 having a corn harvester 20 mounted thereon. The tractor 10 is of the type having a longitudinally extending chassis 11, and a transversely extending rear axle structure having drive wheels 13 mounted thereon. The corn harvester is of the type having picking units 21, first elevators 22 and a processing unit 40. The corn harvester 20 includes a pair of upwardly and rearwardly extending first elevators 22 that terminate in upper end portions or upper free ends 23. Upwardly extending posts 14 are provided upon which the first elevators 22 are pivotally mounted. Downwardly extending portions or mounts 30 are provided on the underside of the first elevators. Pivotable connections 12 are provided between the mounts 30 of the first elevators and the upwardly extending posts.

As can be best seen in FIGURE 2 the first elevators 22 include overshot conveyors 27 made up of chains 28 and slats 29. The upper rung of the conveyor 27 is supported by the material supporting surface 36. The slats 29 hold the ears of corn as they are conveyed up the material supporting surface 36. The first elevators 22 have a bottom plate 37 which along with the fan casings 32 forms a tubular portion or duct 38. The duct 38 is connected to a helical shaped chamber 33 in which the fan means 34 are mounted.

The mounts 30 also function to house the fan casings 32. As can be best seen in FIGURE 2 the fan casings 32 have helical portions 33 that are generated about the center of the fan means 34. The tubular portion or duct 38 of the fan casing opens into the helical portion and is arranged such that it directs a stream of air in a path parallel to the path of material movement in the first elevator. The tubular portion 38 terminates in a rearward directed chute portion 39. Ear corn is adapted to fall from the upper run of the conveyor 27 upon the chute portion 39 which will in turn direct it into the hopper 41 of the processing unit 40. The trash generated by the picking mechanism 21 and in the first elevators 22 also falls downwardly from the upper end portion of the conveyor 27. Before the trash encounters the chute portion 39 it must pass through the air stream flowing from the duct 38 and will be carried rearwardly and upwardly by the air stream.

The upper end of each first elevator 22 is covered with a cap 50. The caps 50 include downwardly directed deflectors 51 which will function to deflect the air stream downwardly and rearwardly when it is encountered. An elastomer gasket 52 is provided around the rear edge of cap 50 for a purpose that will be discussed later.

A processing unit 40 such as shelter or husker is a unit of the corn harvester 20 and is arranged transversely across the rear of the tractor 10. The processing unit 40 has hoppers 41 arranged to receive material from each of the first elevators 22. A cover 42 is provided over each of the hoppers 41 and includes deflectors 43 and trash openings 44. The deflectors 43 function to guide and direct the air stream and the trash carried therein rearwardly and downwardly such that it is disposed of through the trash openings 44. The covers 42 are shaped such that they envelop around the caps 50 of the first elevator and the elastomer gaskets 52 carried by the edges of the caps 50 engage the inner surface of the covers 42 thus forming a seal between the caps 50 and the covers 42. The overlapping of the covers 42 with respect to the caps 50 and the elastomer gaskets 52 make it possible to readily mount and dismount the processing unit 40 and yet maintain a sealed passageway between the first elevators and the processing unit.

Rotary power for the fan means 34 can be obtained from any of the rotating elements of the corn harvester. A convenient source for this power is the upper shaft of conveyor 27. As illustrated, a belt drive 60 can be provided from the conveyor 27 to the fan means 34.

Trash such as leaves, broken husk and dirt are created in the picking mechanism of the corn harvester. This trash is conveyed upwardly through the first elevators 22 by the conveyor 27. As the trash along with the picked ears of corn reaches the top of the conveyor 27 it falls downwardly towards the chute portion 39.

The fan means 34 produces an air stream that is directed by the bottom plate 37 of the first elevator and the tubular portion or duct 38 of the fan casing through the material falling from the upper end of the conveyor 27. The heavy ears of corn are not effected by this air stream and thus continue in their path towards chute portion 39 which in turn directs them into the hoppers 41. The light trash, however, is effected by the air stream and is blown upwardly and rearwardly in the path of the air stream. The air stream along with the suppored trash encounters the downward directed deflectors 51 of the caps 50 which functions to turn the air stream downwardly and rearwardly. The deflector portions 43 of the covers 42 continue to guide the air stream downwardly and rearwardly through the trash openings 44 formed by the covers 42. By so directing the trash and air stream downwardly and rearwardly it is deposited behind the tractor where it will not interfere with the tractor operator.

Thus, it is seen that a material cleaning unit has been provided in the first elevators of the corn harvester along with means for controlling the air stream and deposit of trash that are an incident of the material cleaning system.

It should be understood of course, that the foregoing disclosure relates to only a preferred embodiment of the invention and that numerous modifications or alterations may be made therein without departing from the spirit and the scope of the invention as set forth in the appended claims.

What is claimed is:

1. A tractor mounted corn picker comprising: a corn picking mechanism extending longitudinally along the tractor, a first elevator connected to said corn picking mechanism and extending upwardly and rearwardly therefrom, said first elevator having an upper end portion, said first elevator having a downwardly extending portion that is adapted to pivotally support the upper end portion of said first elevator, a fan casing having fan means therein mounted in said downwardly extending portion of said first elevator, said fan casing including means for directing the stream of air produced by said fan means upwardly and rearwardly substantially parallel and below said first elevator such that trash falling from said upper end portion that is supported in the air stream will continue in its path past said upper end portion of said first elevator.

2. The invention as set forth in claim 1 wherein a cap is mounted over said upper end portion of said first elevator having a downwardly directed deflector spaced from the free end of said first elevator such that it will direc the air stream and trash rearwardly and downwardly.

References Cited
UNITED STATES PATENTS 2,264,565 12/1941 Conltas et al. _____ 56—18
2,833,410 5/1958 Sisulk et al. _____ 56—12 XR ANTONIO F. GUIDA, *Primary Examiner.*